US006563985B2

United States Patent
Yin et al.

(10) Patent No.: US 6,563,985 B2
(45) Date of Patent: May 13, 2003

(54) SINGLE RESONANT BAND, TUNABLE OPTICAL FIBER WAVELENGTH FILTER BASED ON LONG-PERIOD FIBER GRATING

(75) Inventors: Shizhuo Yin, State College, PA (US); Paul Kurtz, State College, PA (US); Karl Reichard, State College, PA (US); Hongyu Liu, State College, PA (US); Qiming Zhang, State College, PA (US)

(73) Assignee: The Penn State Research Foundation, University Park, PA (US)

(*) Notice: Subject to any disclaimer, the term of this patent is extended or adjusted under 35 U.S.C. 154(b) by 0 days.

(21) Appl. No.: 09/801,100

(22) Filed: Mar. 7, 2001

(65) Prior Publication Data

US 2002/0008913 A1 Jan. 24, 2002

Related U.S. Application Data

(60) Provisional application No. 60/187,284, filed on Mar. 6, 2000.

(51) Int. Cl.[7] .................................................. G02B 6/34
(52) U.S. Cl. .................... 385/37; 385/126; 385/127; 385/128; 359/130
(58) Field of Search ................................ 359/578, 566, 359/130; 385/127, 128, 136, 37, 126

(56) References Cited

U.S. PATENT DOCUMENTS

| 4,726,651 A | * | 2/1988 | Wei et al. ..................... 385/12 |
| 5,007,705 A | | 4/1991 | Morey et al. ............ 350/96.29 |
| 5,647,039 A | | 7/1997 | Judkins et al. ................. 385/37 |
| 5,864,641 A | | 1/1999 | Murphy et al. ................ 385/12 |
| 6,058,226 A | * | 5/2000 | Starodubov ............ 250/227.11 |
| 6,192,177 B1 | | 2/2001 | Amundson et al. ........... 385/37 |

OTHER PUBLICATIONS

Abramov et al. "*Widely Tunable Long–Period Fibre Gratings.*" Electronics Letters. 7th Jan. 1999, Vol. 35, No. 1, pp. 81–82.
H. G. Limberger et al., 'Post–Irradiation Resonance Wavelength Adjustment of Long Period Grating Based Loss Filters', IEE Colloquim on Optical Fibre Gratings (Digest No. 1977/037), London, UK, pp.: 9/1–9/5, Feb. 7, 1997.*

* cited by examiner

*Primary Examiner*—Audrey Chang
*Assistant Examiner*—Arnel C. Lavarias
(74) *Attorney, Agent, or Firm*—Ohlandt, Greeley, Ruggiero & Perle, L.L.P.

(57) ABSTRACT

An optical filter that is tunable over a wide portion of the spectrum, such as the infrared portion. The filter has a core of silica fiber with a first cladding layer of silica fiber disposed thereon. A long period grating is disposed on the core. A second electro-optical cladding layer is disposed on the first cladding layer. The first cladding layer is ultra thin so as to support only a single resonant band over the spectral portion. The resonant band is tunable to different wavelengths in the spectral portion by a voltage applied to the second electro-optic layer. The electro-optic layer is a copolymer that has a refractive index less than that of the silica fiber material. The optical filter has fast tuning speed (nanosecond range), wide tuning range (>50 nm), low insertion loss (<0.1 dB), narrow bandwidth (<0.5 nm), and low sidelobe (<30 dB).

13 Claims, 6 Drawing Sheets

| TYPE | INSERTION LOSS | BANDWIDTH (3dB) | TUNING RANGE | TUNING SPEED | TUNING MECHANISM | COMMENTS |
|---|---|---|---|---|---|---|
| FIBER FP | 2 dB | <0.5 nm | ~10 nm | ms | PZT | COMMERCIALLY AVAILABLE. SUITABLE FOR LOW SPEED NETWORK |
| LIQUID CRYSTAL FP | 3 dB | <0.5 nm | ~50 nm | μs | CRYSTAL ORIENTATION | FASTER SPEED BUT STILL NOT ENOUGH |
| MICROMACHINE FP | 1 dB | <0.5 nm | ~60 nm | 100 μs | MICROMACHINE | NOT FAST ENOUGH |
| CASCADED MZI | LiNbO3 19 dB SILICA: 1 dB | <0.2 nm | ~4 nm | 50 ns | ELECTRO-OPTIC | FAST SPEED. BUT LOW FINESSE AND LIMITED TUNING RANGE |
| FBG | 0.1 dB | <0.2 nm | <10 nm | 2 ms | TEMPERATURE STRETCHING | COMMERCIALLY AVAILABLE. NEGLIGIBLE INSERTION LOSS. SUITABLE FOR LOW SPEED NETWORK |
| AOTF | 4 dB | ~1.5 nm | >60 nm | μs | ACOUSTO-OPTIC | COMMERCIALLY AVAILABLE BUT WIDE BANDWIDTH AND STRONG SIDELOBE |
| EOTF | 4 dB | ~1.5 nm | ~50 nm | ns | ELECTRO-OPTIC | RESEARCH STAGE HIGH SPEED BUT WIDE BANDWIDTH AND STRONG SIDELOBE |
| AWG | 8 dB | <0.2 nm | ~40 nm | 10 ms | THERMO-OPTIC | NOT FAST ENOUGH. ONLY SUITABLE FOR LOW-SPEED NETWORK |
| ACTIVE FILTER | POSSIBLE GAIN | <0.1 nm | <5 nm | ns | CURRENT INJECTION | FAST. BUT LOW TUNING RANGE |

*FIG. 1*
(PRIOR ART)

SINGLE RESONANT BAND, TUNABLE OPTICAL FIBER WAVELENGTH FILTER BASED ON LONG-PERIOD FIBER GRATING

This Application claims the benefit of U.S. Provisional Application No. 60/187,284, filed Mar. 6, 2000.

FIELD OF THE INVENTION

This invention relates to an optical wavelength filter that is operable at ultra-high speeds in the nanosecond range and that is tunable over a wide range.

BACKGROUND OF THE INVENTION

Optical wavelength filters are useful for the advanced fiber optic links used, for example, in optical Wavelength Division Multiplexing (WDM) networks. It is well known that there is an exponentially growing demand on the data transmission bandwidth for both civilian and military applications. Fiber optic links and networks have become the backbones for data transmission with large bandwidth.

In terms of military applications, fiber optic link technology has the unique bandwidth capability, the immunity from electromagnetic interference (EMI) and crosstalk, the light weight and the electrical performance necessary to realize fast data rates and reduced signature multi-function antenna apertures. However, a major remaining issue associated with military fiber-optic systems is high cost. In commercial fiber optic systems, the transmission bandwidth has been enhanced without substantially increasing cost by using WDM networks. WDM technology also has great potential to reduce the cost for military fiber-optic systems by cutting down the number of fiber optic lines and connectors.

In addition, since analog and digital data transmission is dominant in military fiber-optic systems, it is very important to have packet-level and cell-level switching capability in the WDM system so that efficient data transmission can be achieved. To realize packet-level and cell-level switching capability, there is a need for optical filters that are capable of ultra-high-speed (nanosecond) manipulations and of very fast tuning speed.

On the other hand, it is also a very challenging task to develop such a ultra-high speed dynamic WDM network due to the fact that network functionality requires dynamic elements to perform signal processing manipulations at different levels of complexity for circuit as well as packet-level and cell-level switching networks. This functionality includes filtering, routing, add-drop multiplexing, wavelength conversion, optical cross-connects, header reading, and so on. Among these functions a key element is a tunable optical filter.

Since current commercially available dynamic elements, such as Fabry Perot (FP) tunable filters are relatively slow, current dynamic WDM technology relies on relatively low dynamics (i.e., up to millisecond speeds), which is most adequate for circuit switched applications. However, network functionalities such as packet-level or cell-level switching needs much faster speed (i.e., in the nanosecond range). Due to the lack of commercially available ultra-high speed dynamic elements such as tunable filters, currently, packet-level or cell-level switching still has to be implemented by electronics, which limits the huge bandwidth benefit of light signals, increases cost and weight, and reduces the robustness against EMI. In other words, the lack of optical packet-level and cell-level switching becomes a bottleneck for advanced fiber optic links in high speed dynamic WDM networks.

To meet the needs of WDM fiber optic networks, in recent years, a variety of tunable optical filters have been developed. These include Fabry Perot (FP) interferometer tunable filters, Ferroelectric liquid crystal FP filters, micro machined device filters, Mach-Zehnder interferometer (MZI) filters, Fiber Bragg grating (FBG) filters, acousto-optic tunable filters (AOTF), electro-optical tunable filters (EOTF), arrayed waveguide grating (AWG) filters, optical MEMs, active filters. Filter performance is evaluated by filter parameters that include insertion loss, bandwidth, sidelobe suppression, dynamic range, tuning speed, and cost.

Referring to FIG. 1, Table 1 summarizes the performance of the above types of filters. Among these filters, FBG and Fiber FP filters are most commercialized, mainly due to the fact that no medium transformation is required so that the filters are low cost, robust and easy to use. However, FBG and Fiber FP filters are inherently limited in tuning speed to the millisecond range due to their thermal or mechanical mechanisms. Thus, FBG and Fiber FP filters can not be used for packet-level or cell-level switching, in which nanosecond tuning speed is required. On the other hand, although tunable filters based on faster mechanisms such as electro-optic effect can have nanosecond tuning speed, they are still on the research stage. A major impediment to commercialization may be due to complexity and cost. Since this category of filters is not fiber based, medium transformation is required when connected in a fiber optic WDM network. This increases the complexity of the usage and cost.

ETOF filters have wide bandwidth and strong sidelobes. To reduce the bandwidth and strong sidelobes of EOTF, tunable narrow-band filters have been constructed with photorefractive $LiNbO_3$ fibers and bulk crystals. Bragg gratings are holographically written inside the $LiNbO_3$ materials so that narrow bandwidth with low sidelobe can be achieved. Since photorefractive $LiNbO_3$ materials are also electro-optic materials, the refractive index of the material can be fast tuned by the external electric field. The tuning speed can be in the nanosecond range, which is fast enough for the packet-level and cell-level switching. When the refractive index is changed, the effective Bragg grating period is also changed so that the wavelength response of the filter can be tuned. Although a very narrow bandwidth low sidelobe fast tuning speed filter can be synthesized, the tuning range of the filter is very limited. The wavelength tuning range of this Bragg grating filter can be estimated as $$\Delta\lambda \approx \frac{\Delta n}{n} \lambda, \tag{1}$$

where n is the refractive index of the material, $\Delta n$ is the refractive index change, and $\lambda$ is the operating wavelength. Substituting typical values for $LiNbO_3$ materials, (i.e., n=2.3, $\Delta n=10^{-3}$, and $\lambda=1500$ nm) into Equation (1), one can obtain $\Delta\lambda<1$ nm. Obviously, this tuning range is too small for practical use in a dense WDM network. In addition, medium transformation is also required in this type of filter, which further increases the difficulty in commercialization.

Long period gratings (LPG's) that are photoinduced fiber devices couple light from the core of a single-mode optical fiber into a fiber cladding at discrete wavelengths, producing one or more attenuation bands in the fiber transmission. The phase-matching condition of a LPG can be written as $$\lambda_p = (n_{core}^{eff} - n_{clad}^{eff})\Lambda, \tag{2}$$

where $\lambda_p$ is the wavelength of the pth-order resonance peak, $\Lambda$ is the period of the grating, and $n_{core}^{eff}$ and $n_{core}^{eff}$ are effective indices of core and cladding, respectively. Based on Equation (2), the wavelength tuning range $\Delta\lambda$ for the long period grating can be estimated as $$\Delta\lambda = \frac{\Delta(n_{core}^{eff} - n_{clad}^{eff})}{n_{core}^{eff} - n_{clad}^{eff}} \lambda_p, \quad (3)$$

where $\Delta(n_{core}^{eff} - n_{core}^{eff})$ is the difference of the effective refractive index change between the core and cladding. Since the effective refractive indices of core and cladding can be very close, i.e., $n_{core}^{eff} - n_{clad}^{eff} \ll 1$, a small change in the ambient refractive index can result in a big wavelength shift. Thus, a wide tuning range can be achieved. A 50 nm tuning range filter is described by A. Abramov, A. Hale, R. Windeler and T. Strausser in an article entitled *Widely Tunable Long-period Gratings* in Electrical Letters, vol. 35, pages 81, 82, 1999. Although wide tuning range was achieved, the tuning speed is very limited due to the use of low speed thermal tuning.

SUMMARY OF THE INVENTION

The optical filter of the present invention is tunable to different wavelengths in a portion of the spectrum, such as the infrared portion. The optical filter includes a core with a long period grating disposed thereon. A first cladding layer is disposed on the core. A second electro-optic cladding layer is disposed on the first cladding layer. The first cladding layer has an ultra-thin thickness that supports a single resonant band over the portion of the spectrum. The resonant band is tunable to the different wavelengths by a voltage applied to the second electro-optic cladding layer.

The core and the first cladding layer are formed of silica fiber material. The long period grating is fabricated in the fiber core. The refractive index of the electro-optic layer can be tuned by applying the voltage to transparent electrodes disposed thereon. By controlling the voltage across the electro-optic cladding layer, the wavelength spectrum of the filter can be fast and widely tuned.

According to one aspect of the invention, the electro-optic layer is a polymer that has a refractive index lower than the refractive index of said silica fiber material. In some embodiments, the polymer is a copolymer. Preferably, the copolymer is poly(vinylidene flouride-trifluoroethylene).

The optical filter of the present invention has fast tuning speed (nanosecond range), wide tuning range (>50 nm), low insertion loss (<0.1 dB), narrow bandwidth (<0.5 nm), and low sidelobe (<30 dB).

In addition, by taking advantage of wavelength division multiplexing, the total number of fiber optic links required in an optical network is also reduced, which in turn reduces the cost of the fiber optic links. The filter of the invention can be used for high speed packet-level and cell-level switching, which is critical for the high-bit-rate data transmission.

In a broader aspect, the present invention is an electro-optical device that includes a core with a long period grating disposed thereon. A first cladding is layer disposed on the core. A second electro-optic polymeric cladding layer is disposed on the first cladding layer.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIG. 1 is a table depicting various parameters of prior art filters;

DESCRIPTION OF THE PREFERRED EMBODIMENT

Figure 2:
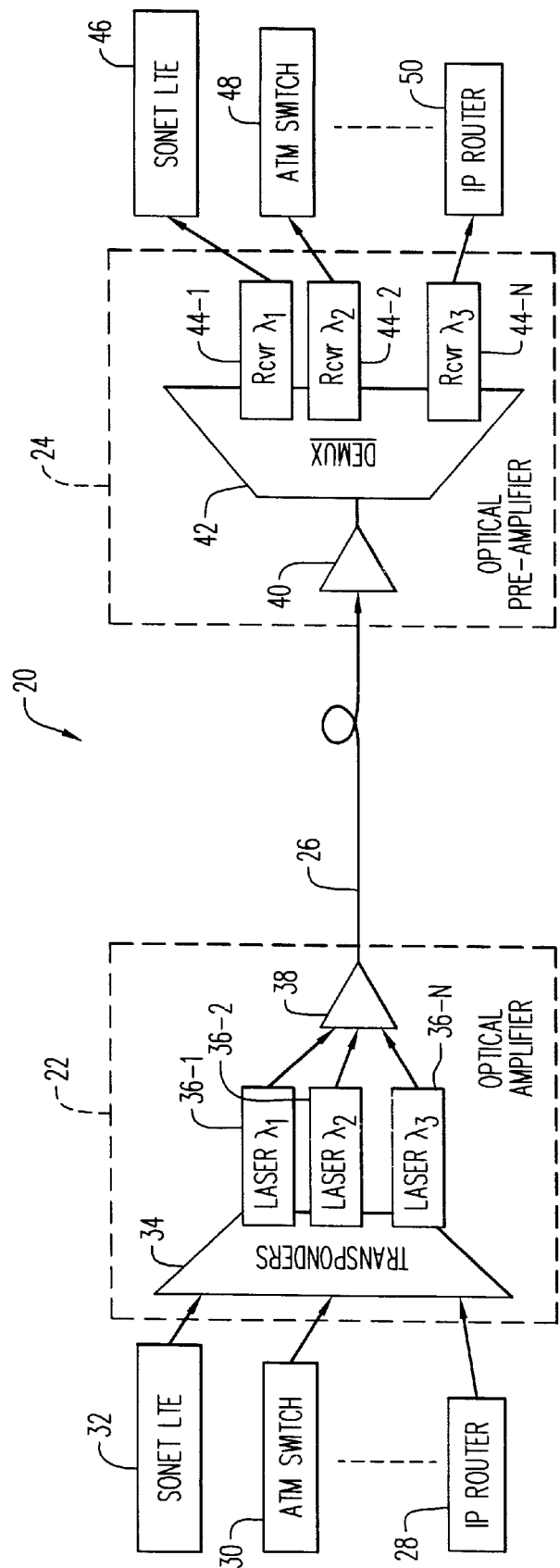
FIG. 2 is a block diagram of a WDM system in which the optical filter of the present invention may be used.

Referring to FIG. 2, a prior art WDM system 20 is shown in which the tunable optical filter of the present invention may be used. WDM system 20 includes a pair of transceivers 22 and 24 interconnected by an optical fiber link 26. Transceivers 22 and 24 are substantially identical in function, but are depicted in FIG. 1 for an example in which transceiver 22 is transmitting and transceiver 24 is receiving.

Transceiver 22 is interconnected to receive messages from an Internet protocol (IP) router 28, an ATM switch 30, a SONET LTE 32. Transceiver 22 combines these messages for transmission on different carrier wavelengths along optical fiber link 26 to transceiver 24. Transceiver 22 includes a transponders section 34, a series of lasers 36-1 and 36-2 to 36-N and an optical amplifier 38. Transponders 34 multiplex the messages from IP router 28, ATM switch 30 and SONET LTE 32 to the series of lasers 36-1 and 36-2 to 36-N. That is, an incoming message is connected to a currently available laser for transmission on the wavelength of that laser. For example the incoming message is multiplexed to laser 36-1 for transmission on wavelength $\lambda_1$. The carrier signal outputs of lasers 36-1 and 36-2 to 36-N are combined and amplified by optical amplifier 38 for transmission as a composite carrier signal on link 26.

Transceiver 24 includes an optical pre-amplifier 40, a demultiplexer 42 and receivers 44-1 and 44-2 to 44-N. The incoming messages are routed by demultiplexer 42 to the receiver of the appropriate wavelength. For example, the message on carrier wavelength $\lambda_1$ is routed to receiver 44-1, which is tuned to wavelength $\lambda_1$. Receiver 44-1 demodulates the message from wavelength and sends the demodulated message to a destination of a SONET LTE 46, an ATM switch 48 or an IP router 50.

Figure 3:
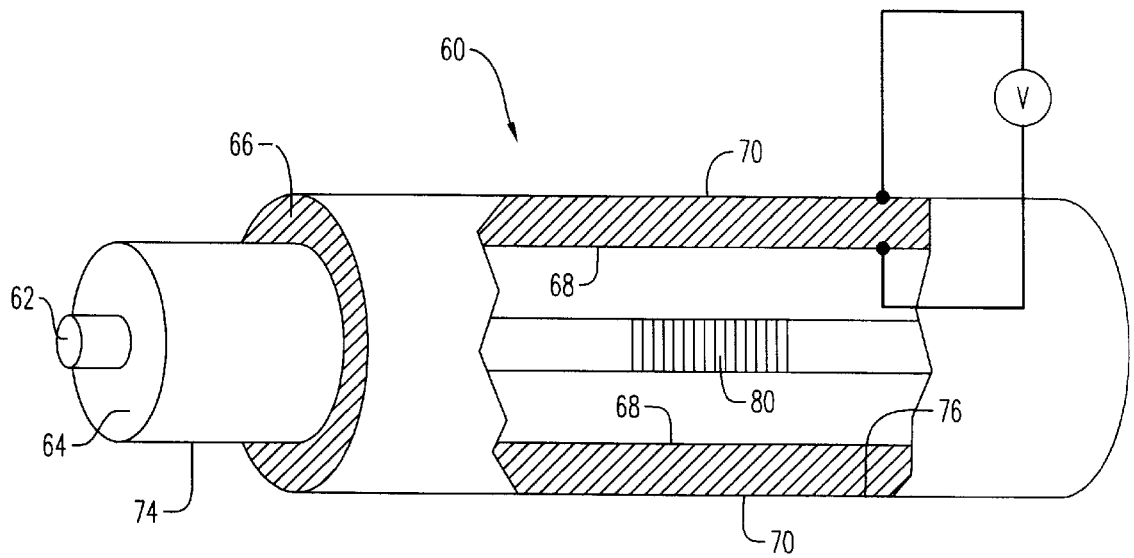
FIG. 3 is a perspective view of the tunable optical filter of the present invention.

Referring to FIG. 3, a tunable optical filter of the present invention is designated by numeral 60. Filter 60 includes a core 62, a first cladding layer 64, a second cladding layer 66, a pair of transparent electrodes 68 and 70 and a long period grating 80. Transparent electrode 68 is disposed at the interface of first cladding layer 64 and second cladding layer 66. For example, transparent electrode 68 may be disposed in, on or adjacent to an outer circumferential surface 74 of first cladding layer 64. Transparent electrode 70 is disposed in, on or adjacent to an outer circumferential surface 76 of second cladding layer 66. Long period grating 80 is disposed on the circumference of core 62.

Core 62 is preferably made of silica fiber. Second cladding layer 66 is made of electro-optical material. First cladding layer 64 is preferably made of silica fiber. In prior art tunable optical filters, the first cladding layer has a diameter on the order of 125 µm, which is rather thick. This thickness allows many cladding modes to exist in the cladding layer so that there can be multiple resonant wavelengths in the infrared region.

An important aspect of the present invention is that first cladding layer 64 has an ultra thin diameter in the range of 20 through 40 µm. Preferably, the diameter of first cladding layer 64 is about 30 µm. This thickness allows only a single resonant band over the entire infrared region (from 1000 nm–1700 nm). When the thickness of first cladding layer 64 is thin enough, there are only a few cladding modes that can exist therein. Thus, there may be only one cladding mode satisfying the Bragg condition in the entire near infrared region.

A unique feature of this single resonant band operation is that it offers the possibility of achieving an extremely wide tunable range without overlap among different resonant bands that could happen in prior art LPG filters.

Figure 4:
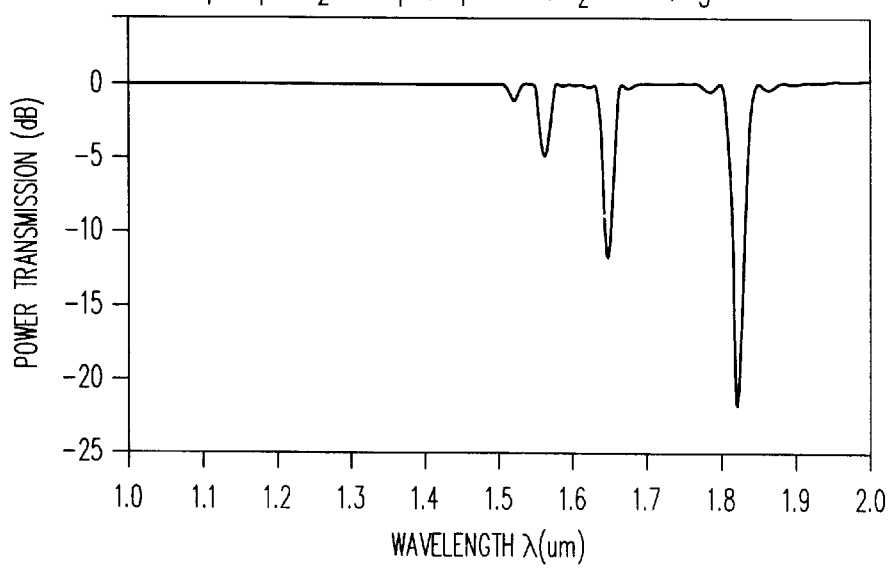
FIG. 4 is a graph depicting the calculated filter spectrum of a regular LPG filter with regular cladding thickness.

A LPG filter has been fabricated with parameters as follows: core refractive index n1=1.4551, cladding refractive index $n_2$=1.4496, core diameter $d_1$=8.3 µm, initial cladding diameter $d_2$=125 µm, grating period Λ=500 µm, and grating length L=25 mm. FIG. 4 shows the calculated filter spectrum. It can be seen that there are multiple resonant peaks in the near infrared region.

Figure 5:
FIG. 5 is a graph depicting the calculated filter spectrum of the FIG. 1 LPG filter with ultra thin cladding.
Figure 6:
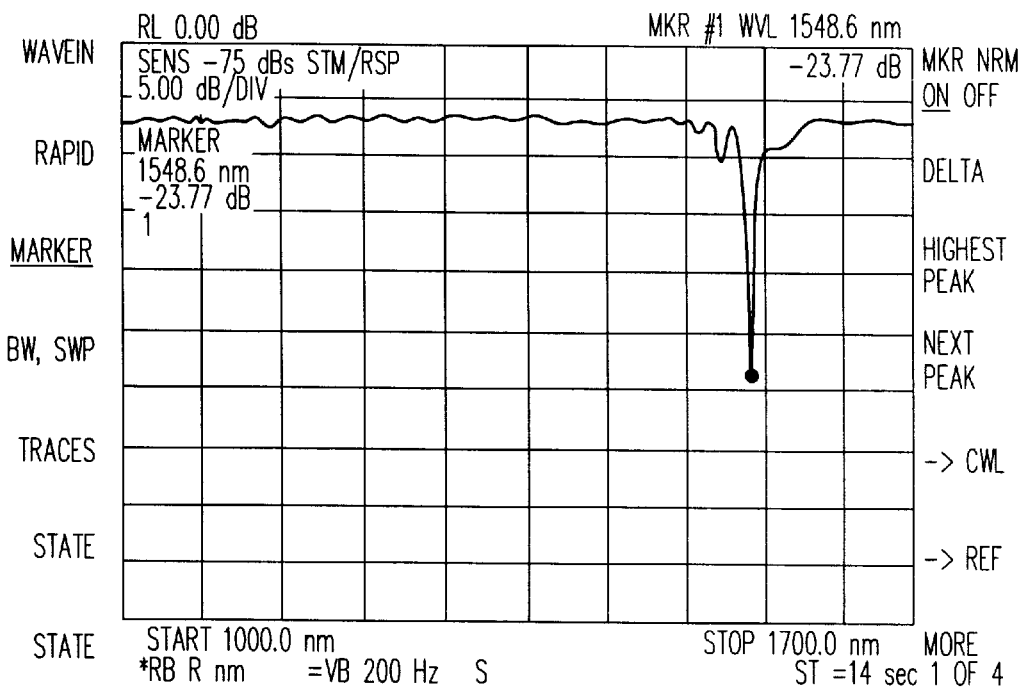
FIG. 6 is a graph depicting an experimental filter spectrum of the FIG. 1 LPG filter with ultra thin cladding.

Then, the diameter of cladding layer 64 was reduced to 35 µm via hydrofluoric acid etching. FIGS. 5 and 6 show the theoretical and experimental results of filter spectrum for the 35 µm diameter cladding layer 64, respectively. It can be seen that there is only a single resonant peak within the entire near infrared range (i.e., 1000 nm–1700 nm). It is believed that the slight difference between the two curves is due to the fact that the selected calculation parameters (such as grating modulation parameters Δn and m) are not exactly the same as the parameters of the actual LPG filter.

Figure 7:
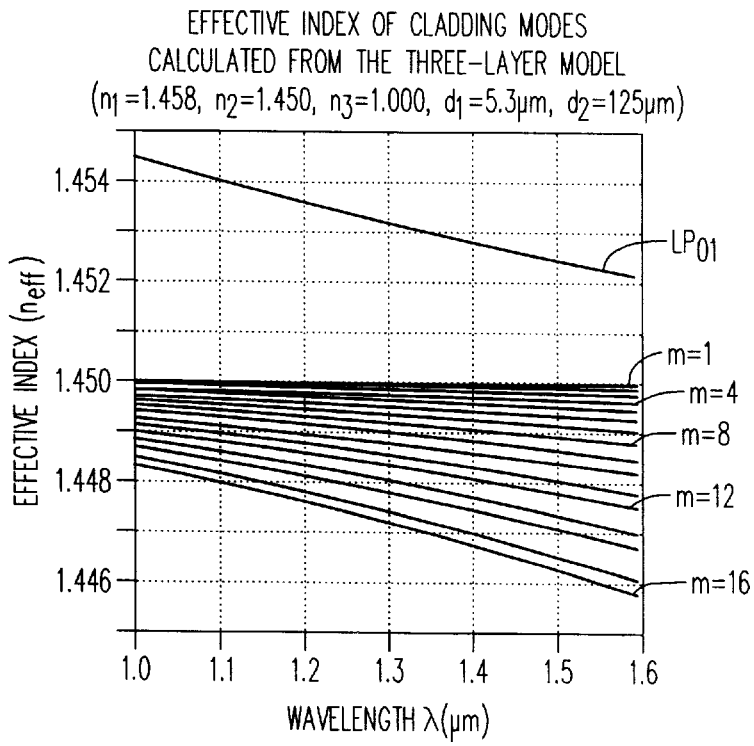
FIG. 7 is a graph depicting the effective refractive index for a regular LPG filter with thick cladding.
Figure 8:
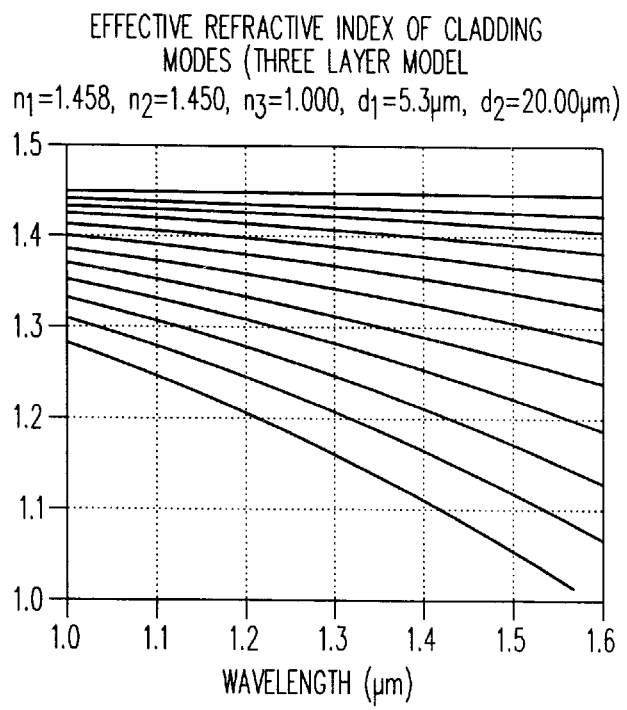
FIG. 8 is graph depicting the effective refractive index for the FIG. 1 LPG filter with ultra thin cladding.

Due to the use of an ultra thin silica cladding layer 64, a relatively short grating period (~10 micron) can be used as the mode converter between the guided mode and cladding mode. This permits a large number of grating periods to be fabricated with reasonable total grating length (e.g., <100 mm). FIGS. 7 and 8 show the calculated effective refractive index for an LPG filter with regular cladding thickness and LPG filter 60 with ultra thin cladding thickness, respectively. It can be seen that when the cladding thickness is thin there are much bigger differences between the effective refractive index of core, $n_{eff}^{co}$, and cladding, $n_{eff}^{cl}$, modes. Since the period of LPG, Λ, is given by $$\Lambda = \lambda/(n_{eff}^{co} - n_{eff}^{cl}), \quad (4)$$

where λ is a resonant wavelength, a much shorter long period grating 80 can be used to realize the mode coupling between core and cladding modes. As shown in FIG. 8, the maximum effective refractive index difference between the core and cladding modes can be as large as 0.15. If $\lambda_p$=1.5 µm, based on Equation (4), the grating period Λ can be 10 µm. Therefore, by using an ultra thin cladding layer, a much smaller grating period can be used. Thus, the total length of the grating can be much smaller for the narrow bandwidth wavelength filter, which in turn increases the compactness and robustness of filter 60. For example, even for 5000 grating periods, the total length of long period grating is only about 50 mm. Note that, although the conventional Bragg grating can also have a very short grating period <1 µm, the filter wavelength response can not be tuned by changing the surrounding refractive index $n_3$. Thus, there is an intrinsic difference between the short period grating fitter 60 of the present invention and the short period Bragg grating.

Also, due to the use of ultra thin silica cladding layer 64, the resonant wavelength of filter 60 is extremely sensitive to the change of the refractive index of second electro-optic cladding layer 66 so that it becomes much easier to tune the wavelength response via the electro-optic effect. Thus, filter 60 could be tuned at very fast speed and with very low driving power via electro-optic effect. Mathematically, the resonant wavelength shift, Δλ, can be written as $$\Delta\lambda = \frac{\Delta(n_{eff}^{co} - n_{eff}^{cl})}{n_{eff}^{co} - n_{eff}^{cl}} \approx \frac{\Delta n_{eff}^{cl}}{n_{eff}^{co} - n_{effe}^{cl}}. \quad (5)$$

In Equation (5), the final result is based on the fact that the effective refractive index of core will almost not change when there is a refractive index change in the surrounding medium.

Figure 9:
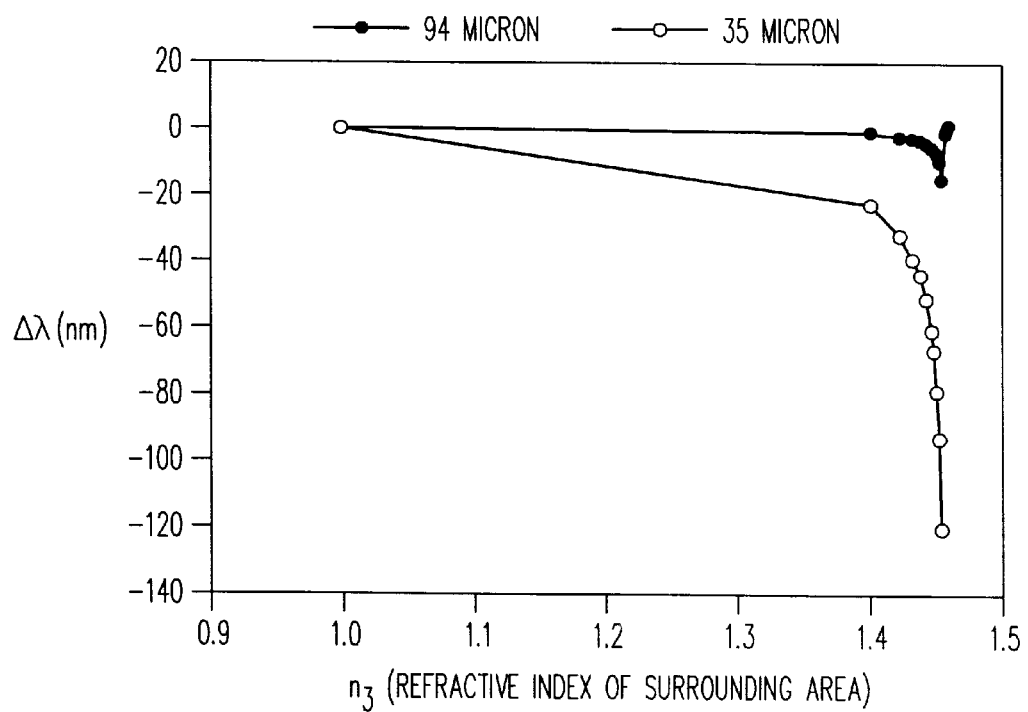
FIG. 9 is a graph depicting an experimental result of the wavelength shift as a function of the refractive index of the surrounding area.

The wavelength shift Δλ as a function of the refractive index of surrounding layer was measured under different cladding thickness conditions as shown in FIG. 9. It can be seen that there is a substantial increase in the wavelength shift when the diameter of cladding layer 64 was reduced to 35 µm. At the most sensitive refractive index region, the wavelength shift could be as large as 30 nm when there is only 2×10$^{-3}$ refractive index change in the surrounding area. Since the 2×10$^{-3}$ refractive index change is achievable for current electro-optic materials, filter 60 could be tuned at very fast speeds in the nm range via the electro-optic effect.

To measure the sensitivity of long period grating 80, the region of the fiber containing the grating was completely immersed in refractive index oils available from Cargille Laboratories, Inc. The oils in the range of 1.4 to 1.46 with increasing step 0.001 were used. This small increasing step was achieved by carefully mixing the index matching oils with different refractive index. It was found that the wavelength shift could be as large as 50 nm when there is only 0.001 change in the ambient refractive index at the most sensitive region. This high sensitivity makes it possible to achieve widely tunable filter by using electro-optic effect to tune the refractive index of ambient medium. This tuning range can cover the entire spectrum of a dense WDM. Generally, the refractive index change of electro-optic material is only in the range of 10$^{-3}$. Thus, this high sensitivity is really necessary. Although liquid crystals may have bigger refractive index change, they have a slower speed.

Although LiNbO$_3$ is one of the most widely used materials for an electro-optic modulator, it can not be used as the ambient material in this case for two reasons. First, the refractive index of LiNbO$_3$ is about 2.3, which is much higher than the refractive index of silica fiber (i.e., ~1.45). To effectively tune the filter, the refractive index of the surrounding material must be lower than that of the silica fiber. Second, since LiNbO$_3$ is a solid crystal, it is very difficult to process it so that it can perfectly surround fiber without any air gap therebetween.

On the other hand, electro-optic polymers have a refractive index that is lower than that of silica fiber. For example, one polymer with such a lower refractive index is electron-irradiated poly(vinylidene fluoride-trifluoroethylene)

Figure 10:
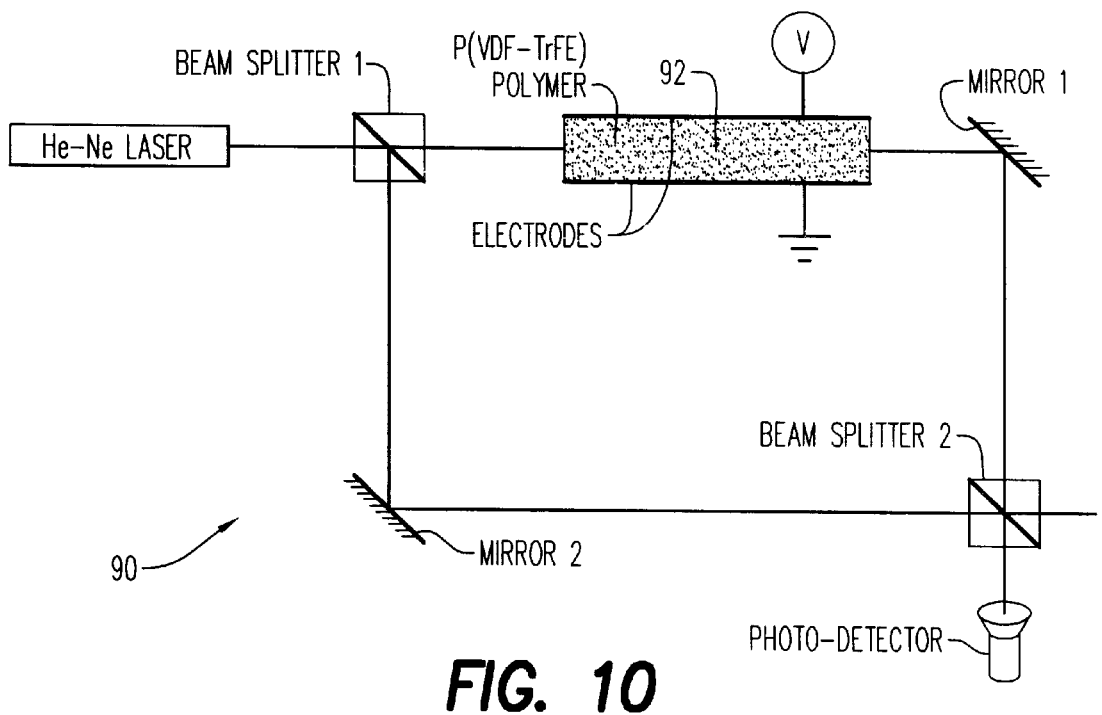
FIG. 10 is an experimental test setup for measurement of the refractive index of a copolymer.

P(VDF-TrFE) copolymer. A polymer sample with the following parameters was prepared:
Composition 70/30 ratio
Thickness t=20 μm
Length L=1 mm
Electron-radiation 70 Mrad Referring to FIG. 10, an experimental set-up 90 is shown for the measurement of the electro-optic coefficient $r_{33}$ of the copolymer 92. The set-up 90 is basically a Mach-Zehnder interferometer set-up. The copolymer sample 92 was inserted in one-arm. By applying a voltage V on copolymer sample 92, the refractive index of the copolymer sample 92 will be changed if it has an electro-optic effect. It was found that the interference fringe shifted one period (i.e., corresponding to one wavelength change in the optical path) when 300 V was applied to the sample. Substituting n=1.42, V=300 V, wavelength λ=633 nm, t=20 μm, and L=1 mm into the following well-known equation, $$r_{33} = \frac{2t\lambda}{n^3 VL},\qquad(6)$$

one can get $r_{33}$=40 (pm/V). Thus, the P(VDF-TrFE) copolymer 92 has a very good electro-optic effect, which produces >$10^{-3}$ refractive index change. In addition, the refractive index of this polymer was measured about 1.42, which is slightly smaller than the refractive index of the silica. This is perfectly suitable for tuning the wavelength response of the long period grating as described by Equation 3. To make sure that the interference fringe shift is indeed caused by the refractive index change induced optical path change rather than by the geometric length change, the whole sample was clamped by sealing it with epoxy. After this sealing, no detectable geometric dimension change in the longitudinal direction (i.e., light passing through direction) was found.

To check the feasibility of the proposed fast tuning speed filter, we evaluated the required parameters of the filter. To meet the needs of a dense WDM fiber optic network, the required filter bandwidth $\Delta\lambda_B$ and tuning range $\Delta\lambda_R$ may be 0.5 nm and 50 nm, respectively. Assume that the operating wavelength is 1550 nm. To achieve 0.5 nm bandwidth, the required number of periods of LPG can be estimated by N≈λ/$\Delta\lambda_B$≈3000. If the LPG period is Λ=40 μm, then the total length of the grating L will be L≈12 cm. Note that, this is doable with current long period grating writing technology. Table 2 summarizes the parameters of the filter to be fabricated.

TABLE 2

The parameters of the fast tuning speed widely tunable optical filter

| | |
|---|---|
| Core | Silica fiber with diameter about 8.3 μm |
| First cladding layer | Silica with diameter about 50 μm |
| Second cladding layer | P(VDF-TrFE) copolymer with thickness about 20 μm |
| LPG period | 40 μm |
| Total length of grating | 12 cm |
| Tuning speed | Nanosecond range |
| Tuning range | >50 nm |
| Filter bandwidth | <0.5 nm |
| Insertion loss | <0.1 dB |

The major fabrication steps for filter 60 can be described as follows:
1. Fabricate the long period grating 80 in silica fiber core 62
2. Etch the silica fiber 64 by immersing it in HF acid until the proper cladding diameter is achieved.
3. Coat a very thin layer transparent electrode 68
4. Coat the P(VDF-TrFE) copolymer as second cladding layer 66
5. Coat another thin layer electrode 70
6. Radiate the polymer layer by high energy electrons
7. Package the filter The present invention having been thus described with particular reference to the preferred forms thereof, it will be obvious that various changes and modifications may be made therein without departing from the spirit and scope of the present invention as defined in the appended claims.

What is claimed is:

1. An optical filter that has a wavelength response over a portion of the spectrum and that is tunable to different wavelengths in said portion of the spectrum, said optical filter comprising:
a core with a long period grating disposed thereon;
a first cladding layer disposed on said core and a second electro-optic cladding layer disposed on said first cladding layer, wherein said first cladding layer has an ultra-thin thickness that supports only a single resonant band over said portion of the spectrum as compared to greater thicknesses of said first cladding that support a plurality of resonant bands over said portion of the spectrum, wherein said ultra-thin thickness is in the range of about 20 to about 40 μm and wherein said resonant band is tunable to said different wavelengths by a voltage applied to said second electro-optic cladding layer.

2. The optical filter of claim 1, wherein said single resonant band has a bandwidth less than about 0.5 nanometers and sidelobes less than about 30 dB.

3. The optic filter of claim 1, wherein said core and said first cladding layer are each formed of silica fiber material.

4. The optical filter of claim 3, wherein said second electro-optic layer is a polymer that has a refractive index lower than a refractive index of said silica fiber material.

5. The optical filter of claim 4, further comprising first and second electrodes disposed in electrical contact with said second cladding layer, and wherein said voltage is applied to said first and second electrodes.

6. The optical filter of claim 4, wherein said polymer is a copolymer.

7. The optical filter of claim 6, wherein said copolymer is poly(vinylidene flouride-trifluoroethylene).

8. The optical filter of claim 1, wherein said core is substantially cylindrical, wherein said first cladding layer is disposed on a surface of said cylindrical core, and wherein said second cladding layer is disposed on top of said first cladding layer.

9. An optical filter that has a wavelength response over a portion of the spectrum and that is tunable to different wavelengths in said portion of the spectrum, said optical filter comprising:
a core with a long period grating disposed thereon;
a first cladding layer disposed on said core and a second electro-optic cladding layer disposed on said first cladding layer, wherein said first cladding layer has an ultra-thin thickness that supports only a single resonant band over said portion of the spectrum as compared to greater thicknesses of said first cladding that support a plurality of resonant bands over said portion of the spectrum, wherein said resonant band is tunable to said different wavelengths by a voltage applied to said second electro-optic cladding layer, and wherein said plurality of resonant bands is three or more.

10. An optical filter that has a wavelength response over a portion of the spectrum and that is tunable to different wavelengths in said portion of the spectrum, said optical filter comprising:

a core with a long period grating disposed thereon;

a first cladding layer disposed on said core and a second electro-optic cladding layer disposed on said first cladding layer, wherein said first cladding layer has an ultra-thin thickness that supports only a single resonant band over said portion of the spectrum as compared to greater thicknesses of said first cladding that support a plurality of resonant bands said portion of the spectrum, wherein said resonant band is tunable to said different wavelengths by a voltage applied to said second electro-optic cladding layer, and wherein said portion of the spectrum is substantially the entire near infrared range.

11. A method for producing an optical filter, comprising:

providing an optical core with a long period grating;

disposing a cladding layer on said core, said cladding layer having a thickness that supports a plurality of resonant bands over a portion of the spectrum;

reducing said thickness at least until said thickness supports only a single resonant band over said portion of the spectrum, and wherein said thickness is reduced to the range of about 20 to about 40 μm.

12. The method of claim 11, wherein said cladding layer is a first cladding layer, and further comprising disposing a second cladding layer over said first cladding layer.

13. A method for producing an optical filter, comprising:

providing an optical core with a long period grating;

disposing a cladding layer on said core, said cladding layer having a thickness that supports a plurality of resonant bands over a portion of the spectrum, wherein said portion of the spectrum is substantially the entire near infrared range;

reducing said thickness at least until said thickness supports only a single resonant band over said portion of the spectrum.

* * * * *